Patented July 18, 1933

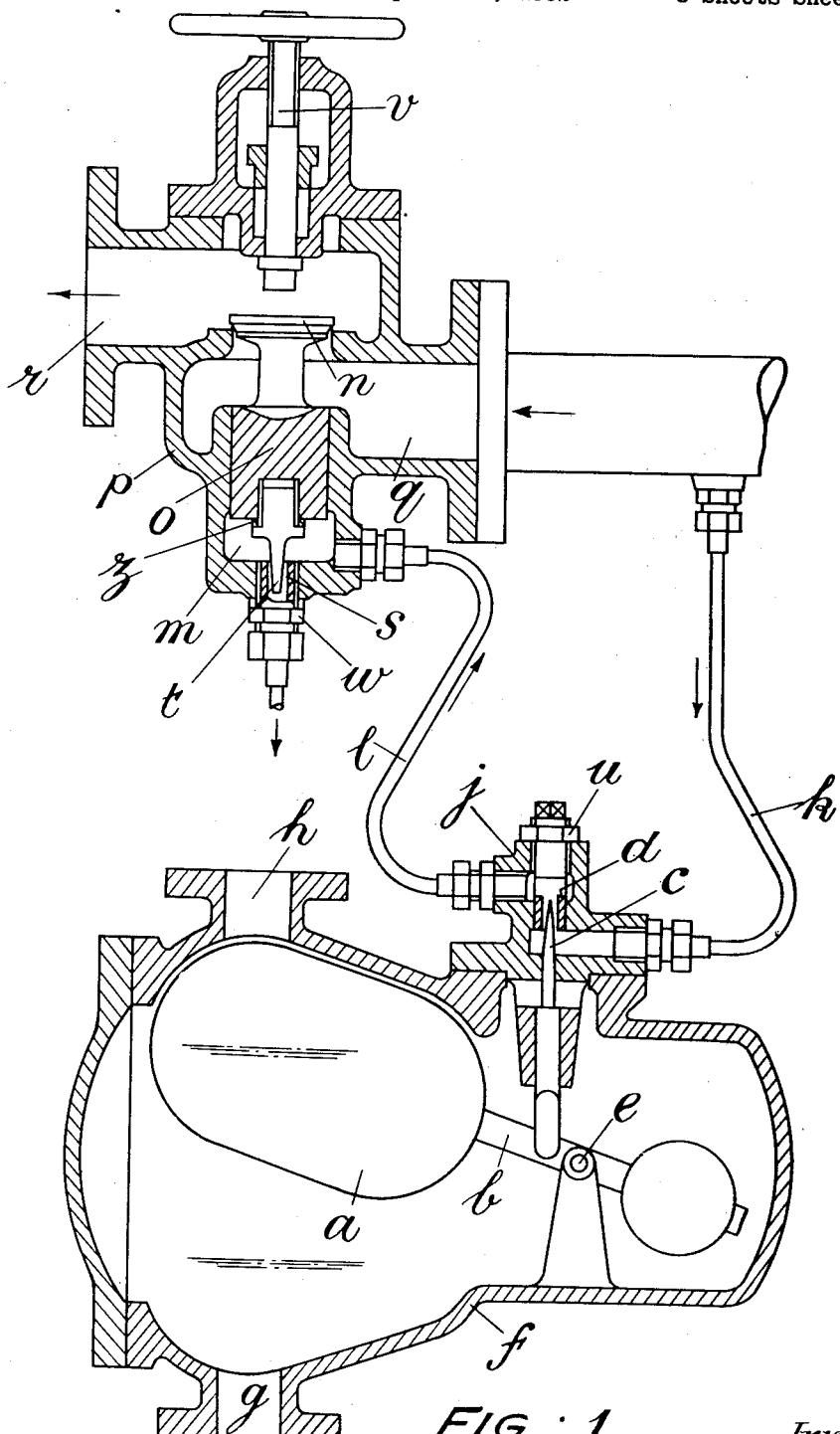
FIG: 1.
Inventor:
Harold Hillier.
By William C Linton
Attorney.

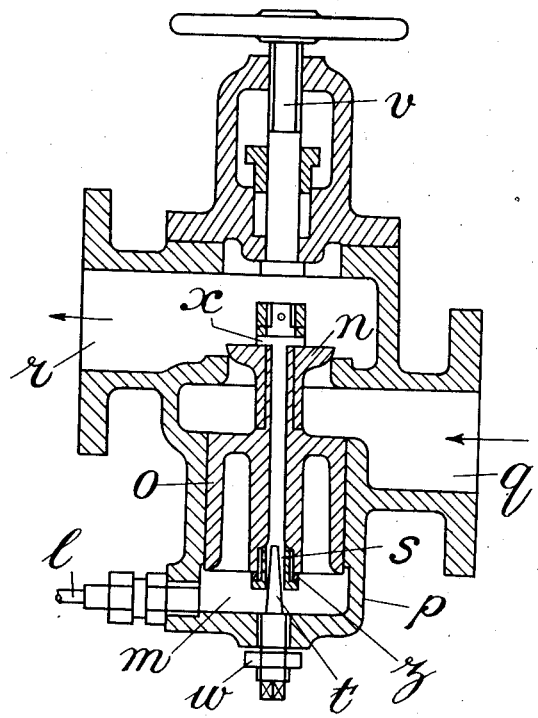
FIG: 2.
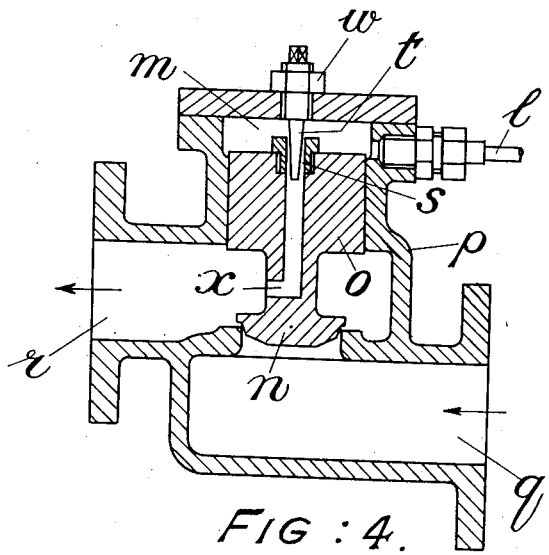
FIG: 4.

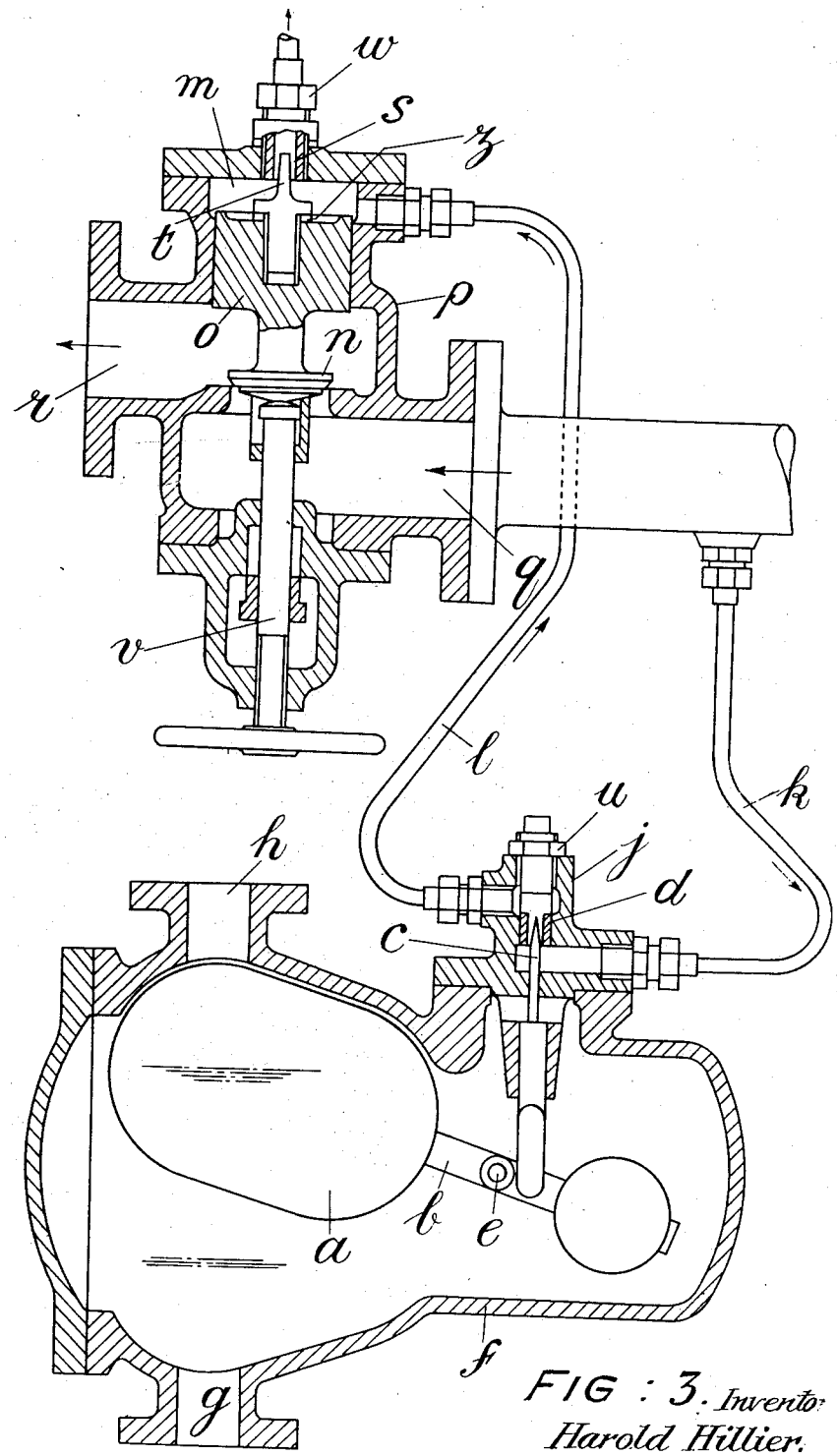
FIG: 3.

1,919,109

UNITED STATES PATENT OFFICE

HAROLD HILLIER, OF GLASGOW, SCOTLAND, ASSIGNOR TO G. & J. WEIR, LIMITED, OF GLASGOW, SCOTLAND

LIQUID LEVEL REGULATOR

Application filed April 23, 1932, Serial No. 607,189, and in Great Britain May 5, 1931.

This invention relates to feed water regulators particularly applicable to steam generators.

There are in use or have been proposed many feed water regulators for steam generators which involve a main valve which controls the flow of water delivered by the feed pump into the generator and an auxiliary valve operated by a float in a vessel in communication with the generator so as always to have the same water level as the generator. The float controls the operation of the main valve by controlling the pressure in a pressure chamber which affects the main valve. In some of these feed water regulators the auxiliary valve is incorporated with the main valve; in others it is remote from the main valve with a pipe connection between the two. Generally, these feed water regulators have the defect that the movement of the main valve is of an intermittent or pulsating nature.

The present invention also involves a main valve and a float-operated auxiliary valve remote from the main valve and connected thereto by a pipe or duct. The object of the present invention is to provide an arrangement wherein the main valve is gradually and steadily opened or closed, with changes of the water level in the generator or the like.

This object is attained according to the present invention by the arrangement of the auxiliary valve to give a gradually varying effective opening, varying as the water level changes in the generator or the like, and the provision of a pilot valve or throat in a flow-off connection from the pressure chamber, the arrangement of this pilot valve being such as to give also a correspondingly gradually varying effective area for flow-off from the chamber with movement of the main valve.

The effective opening of the auxiliary valve may increase gradually as the water level falls, in which case the effective area through the flow-off connection from the pressure chamber increases gradually, as the main valve opens, or the effective area past the auxiliary valve may be arranged to decrease gradually as the water level falls, in which case the effective area through the flow-off connection from the pressure chamber decreases gradually as the main valve opens.

It is desirable to be able to adjust the water level maintained in the generator by the regulator, and for this purpose means may be provided whereby the seat of the auxiliary valve can be moved so that the auxiliary valve closes before the float reaches its top position.

For the same purpose means may be provided for adjusting the position of the pilot valve in the flow-off connection from the pressure chamber so that the effective area of such passage can be varied independently of the movement of the piston so that the required quantity of water passing through such pilot valve can be increased or decreased as may be found necessary to cause the main valve to commence to open with a given position of the float and auxiliary valve. The predetermined water level in the generator at which the main valve opens can by this means be varied. Screw-down gear may be provided so that the main valve can be operated by hand when desired.

The water passing through the auxiliary valve may be arranged to pass through the pressure chamber after it has passed the auxiliary valve or it may be arranged to pass through the pressure chamber before it passes the auxiliary valve.

It may be arranged for the water which passes the auxiliary valve and through the flow-off connection in series in either order to flow subsequently through an outlet arranged in the valve casing, or the water may be led into the generator through suitable passages.

In the accompanying drawings which illustrate the invention, Fig. 1 is a sectional elevation of a feed regulator for a steam generator with the pressure chamber below the main valve and the water flowing therefrom led to the atmosphere or other suitable place at low pressure.

Fig. 2 is a sectional elevation of the main valve of a feed regulator for a steam generator with the pressure chamber below the main valve and the water flowing from the pressure chamber led into the generator.

Fig. 3 is a sectional elevation of a feed regulator for a steam generator with the pressure chamber above the main valve and the water flowing past the pressure chamber valve led to the atmosphere or other suitable place at low pressure.

Fig. 4 is a sectional arrangement of the main valve of a feed regulator for a steam generator with the pressure chamber above the main valve and the water flowing from the pressure chamber led into the generator.

Referring to Fig. 1, a float $a$ is carried by a lever $b$ which is operatively connected to an auxiliary valve $c$ cooperating with a seat $d$. The lever $b$ is free to oscillate about a fulcrum $e$ so that, when the float $a$ falls, the auxiliary valve $c$ falls; and, when the float $a$ rises, the auxiliary valve $c$ rises. The float $a$ is housed in a box $f$ connected to the steam generator by pipes (not shown) secured to branches $g$ and $h$ so that the water level in the box $f$ is the same as the water level in the generator. The auxiliary valve seat $d$ is secured in a casting $j$ having an inlet connection $k$ connected to the feed pump discharge line, so that feed line pressure prevails at the inlet side of the auxiliary valve $c$. Water passing the auxiliary valve $c$ flows through the connection $l$ to the pressure chamber $m$.

The main valve $n$ is unitary with a piston $o$ which is disposed below the main valve and is of the same diameter or smaller in diameter. The piston $o$ is guided in the valve casing; its lower face forms the top wall of the pressure chamber $m$. Water discharged by the feed pump enters the valve casing $p$ by way of the inlet branch $q$, and after passing the main valve $n$, flows through the outlet branch $r$ into the steam generator. The valve casing $p$ is preferably bolted direct to the steam generator by the branch $r$. The pressure chamber $m$ is provided with a flow-off passage $s$; and a needle pilot valve $t$ secured in the piston $o$ is so arranged that it registers with this passage. Water leaving by the flow-off passage $s$ is led to a feed tank at atmospheric pressure, or to any other suitable place where the pressure is substantially lower than the pressure in the steam generator. The needle valve $t$ is constituted by a long tapering shank which causes the area through the flow-off passage $s$ to vary gradually with movement of the main valve $n$. In the same way, the auxiliary valve $c$ has a long tapering end portion which varies gradually the area for the flow of water through the seat $d$ with movement of the float $a$ and auxiliary valve $c$.

When the float $a$ is at a predetermined high-water level, the auxiliary valve $c$ closes the passage through the seat $d$. When the water level in the steam generator falls so that the float $a$ falls below the predetermined high level, the auxiliary valve $c$ falls and opens a passage through the seat $d$, the area of such passage increasing gradually as the float $a$, and therefore the auxiliary valve $c$, falls to a predetermined low level.

When the auxiliary valve $c$ opens, there is flow of water from the feed pump discharge line through the connection $k$, past the auxiliary valve $c$ and then through the connection $l$ to the pressure chamber $m$.

The water passing through the connection $l$ is supplemented by water which flows from the inlet branch $q$ through the clearance between the piston $o$ and the valve casing $p$ into the pressure chamber $m$. The pressure in the chamber $m$ rises and causes the piston $o$ to rise so that the main valve $n$ opens and allows feed water to flow through the branch $r$ into the steam generator. As the piston $o$ rises, the needle valve $t$ is partially withdrawn from the flow-off passage $s$, the effective area for the flow-off of water being thereby increased until a position of equilibrium is reached when the pressure prevailing in the chamber $m$ holds the main valve $n$ in a partially open position. If the water level falls to another level, the auxiliary valve $c$ will be opened to pass an increased quantity of water so that the piston $o$ and the needle valve $t$ must rise as necessary to permit the increased quantity of water to pass through the flow-off passage $s$, the main valve $n$ being caused to open wider to pass an increased quantity of feed water into the steam generator. The pressure in the chamber $m$ will be substantially constant and any rise or fall in the pressure will cause the main valve $n$ to rise or fall and adjust the needle valve $t$ as necessary to restore the pressure in the chamber $m$ to its substantially constant value.

For any given water level between the predetermined high water level and the predetermined low water level, the auxiliary valve $c$ passes a corresponding quantity of water, which must subsequently pass the needle valve $t$ and so causes the main valve $n$ to take up a corresponding position, the valve $n$ being thereby opened by a corresponding amount, so that for any given water level the position of the valve $n$ is automatically adjusted to pass a steady flow of water into the steam generator equal to the rate of the evaporation. The arrangement is such that the main valve $n$ is closed when the water level is at the predetermined high level, is full open when the water is at the predetermined low level, opens gradually as the water level falls from the high level to the low level, and is maintained in equilibrium in a partially open position for any intermediate water level. A steady flow of feed water into the steam generator is thereby ensured at all times when evaporation is taking place.

The auxiliary valve seat $d$ is screwed into the casting $j$ so that its position relatively to the auxiliary valve $c$ can be adjusted as desired. A nut $u$ is provided to lock the seat in any desired position.

Washers $z$ may be provided between the needle valve $t$ and the piston $o$ to enable the position of the needle valve $t$ to be adjusted relatively to the flow-off passage $s$. A hand-operated spindle $v$ is provided so that, when desired, the main valve $n$ can be secured in the closed position or its lift limited to any desired amount.

It will be appreciated that the float box can be arranged at any convenient position which may be remote from the main valve $n$, and yet the main valve is gradually and steadily opened or closed according to the water level in the steam generator.

The valve seat in a passage $s$ is provided with a lock nut $w$ to enable it to be locked in any desired position relatively to the needle valve $t$.

Referring to Fig. 2, the float box and auxiliary valve are the same as shown in Fig. 1. The flow of water past the auxiliary valve $c$ passes through the connection $l$ into the pressure chamber $m$. The piston $o$ is larger in diameter than the main valve $n$. The needle valve $t$ is screwed into the valve casing $p$ and has a tapered extremity which projects into a flow-off passage $s$ arranged axially of the piston $o$. Water entering the pressure chamber $m$ from the connection $l$ passes by way of the passage $s$, and passages $x$, into the steam generator. The needle valve $t$ is provided with a lock nut $w$ to enable it to be locked in any desired position relatively to the entrance to the passage $s$.

As the float falls from the predetermined high level to the predetermined low level the auxiliary valve $c$ passes a gradually increasing quantity of water which must subsequently pass the needle valve $t$. For any given flow of water past the auxiliary valve $c$ and the needle valve $t$ the main valve must rise to such a position that the area past the needle valve $t$ causes a pressure in the chamber $m$ which maintains the main valve $n$ in equilibrium. The main valve $n$ is thereby caused to open or close gradually and steadily according to the fall or rise of the water level in the steam generator and is maintained in equilibrium in a partially open position for any given water level between the high and low water levels, thus ensuring a steady flow of water into the generator at all times corresponding to the evaporation.

Referring to Fig. 3, the auxiliary valve $c$ rises when the float falls and vice versa. The piston $o$ is arranged above the main valve $n$ so that the needle valve $t$ penetrates the passage $s$ in the valve casing $p$.

As the water level in the generator falls the auxiliary valve $c$ gives a gradually varying opening which decreases as the float $a$ falls. At the same time the main valve $n$ is caused to open and causes the needle valve $t$ to give a correspondingly gradually varying opening of the flow-off passage $s$, i. e., the effective area through the flow-off passage $s$ decreases as the main valve opens so that the area through the auxiliary valve $c$ and the flow-off passage $s$ decrease and increase as the float falls and rises.

When the water level in the generator is at the predetermined high level, the auxiliary valve $c$ is full open, the needle valve $t$ is full open, and the main valve $n$ is closed. As the water level falls, the auxiliary valve $c$ partially closes and reduces the amount of water flowing through the connection $l$ to the pressure chamber $m$. The pressure in the chamber $m$ falls slightly until the main valve $n$ rises and partially closes the needle valve $t$ until the pressure in the chamber $m$ is that which will keep the main valve in equilibrium in a partially open position, corresponding to the generator water level. If the water level continues to fall, the auxiliary valve $c$ gradually closes and the main valve $n$ opens, until at the predetermined low-water level the auxiliary valve $c$ is completely closed and the main valve is full open.

Referring to Fig. 4, it is to be understood that the float box $f$ and auxiliary valve $c$ are as shown in Fig. 3, the flow of water past the auxiliary valve $c$ passing through the connection $l$ into the pressure chamber $m$. The flow-off passage $s$ from the chamber $m$ is arranged in the piston $o$ so that water flowing therethrough passes into the steam generator by way of the port $x$ and the branch $r$. The movements of the auxiliary valve $c$ determine the quantity of water flowing through the connection $l$, and the main valve $n$ must rise or fall as necessary to close or open the needle valve $t$ to pass the water with a pressure in the chamber $m$ which will maintain the main valve $n$ in equilibrium in a partially open position corresponding to a given water level. The main valve $n$ is thereby constrained hydraulically to open or close gradually and steadily according to the water level in the steam generator.

Having thus described my invention, what I claim as new and desire to secure by Letters Patent is:—

1. A feed water regulator comprising, in combination, a main valve, a piston unitary with said main valve, a chamber accommodating said piston, a passage for pressure fluid connected to said chamber, the face of said piston remote from said main valve being exposed to the pressure of said fluid in said chamber, a flow-off connection from said chamber, a float-operated auxiliary valve controlling said passage for pressure fluid, and a pilot needle valve depending for its operation on the movement of said piston and main valve and controlling said flow-off connection.

2. A feed water regulator comprising, in combination, a main valve, a piston unitary with said main valve, a chamber accommodating said piston, a passage for pressure fluid connected to said chamber, the face of said piston remote from said main valve being exposed to the pressure of said fluid in said chamber, a flow-off connection from said chamber, a float-operated auxiliary valve controlling said passage for pressure fluid, an adjustable annular seat for said float-operated valve, and a pilot needle valve depending for its operation on the movement of said piston and main valve and controlling said flow-off connection.

3. A feed water regulator comprising, in combination, a main valve, a piston unitary with said main valve, a chamber accommodating said piston, a passage for pressure fluid connected to said chamber, the face of said piston remote from said main valve being exposed to the pressure of said fluid in said chamber, a flow-off connection from said chamber, a float-operated auxiliary valve controlling said passage for pressure fluid, and a pilot needle valve adjustable relatively to piston, said pilot needle valve depending for its operation on the movement of said piston and main valve and controlling said flow-off connection.

4. A feed water regulator comprising, in combination, a main valve, a piston unitary with said main valve, a chamber accommodating said piston, a passage for pressure fluid connected to said chamber, the face of said piston remote from said main valve being exposed to the pressure of said fluid in said chamber, a flow-off connection from said chamber, and auxiliary valve controlling said passage for pressure fluid, a float operating said auxiliary valve, causing said auxiliary valve to pass an increasing quantity of water as said float falls, and a pilot needle valve depending for its operation on the movement of said piston and main valve and controlling said flow-off connection, said pilot needle valve passing a gradually increasing quantity of water as said float falls.

5. A feed water regulator comprising in combination, a main valve, a piston unitary with said main valve, a chamber accommodating said piston, a passage for pressure fluid connected to said chamber, the face of said piston remote from said main valve being exposed to the pressure of said fluid in said chamber, a flow-off connection from said chamber, an auxiliary valve controlling said passage for pressure fluid, a float operating said auxiliary valve, causing said auxiliary valve to pass a decreasing quantity of water as said float falls, and a pilot needle valve depending for its operation on the movement of said piston and main valve and controlling said flow-off connection, said pilot needle valve passing a gradually decreasing quantity of water as said float falls.

6. A feed water regulator, comprising, in combination, a main valve, a piston unitary with said main valve, a chamber accommodating said piston, a float-operated valve remote from said main valve, a needle valve dependent for its operation on the movement of said piston, and passages for pressure fluid series-connected to said chamber and controlled respectively by said float-operated valve and by said needle valve.

7. A feed water regulator, comprising, in combination, a main valve, a piston unitary with said main valve, a chamber accommodating said piston, a float-operated valve remote from said main valve, a needle valve dependent for its operation on the movement of said piston, an exit passage from said chamber controlled by said needle valve, and an inlet passage to said chamber controlled by said float-operated valve.

8. A boiler feed water regulator, comprising, in combination, a main valve in the feed line to the boiler, a piston unitary with said main valve, a chamber accommodating said piston, a float-operated valve remote from said main valve, a needle valve dependent for its operation on the movement of said piston, and inlet and outlet connections to said chamber controlled by said float-operated valve and by said needle valve, said outlet connection discharging to the boiler side of the feed line beyond said main valve.

9. A feed water regulator, comprising, in combination, a main valve, a piston unitary with said main valve, a chamber accommodating said piston, inlet and outlet connections to said chamber, a float-operated valve remote from said main valve and controlling said inlet connection, and a needle valve dependent for its operation on the movement of said piston, and controlling said inlet connection, said float-operated valve and needle valve arranged to pass an increasing quantity of water as the float falls.

10. A boiler feed water regulator, comprising, in combination, a main valve controlling the feed line to the boiler, a piston unitary with said main valve, a chamber accommodating said piston, a float-operated needle valve remote from said main valve, a needle valve dependent for its operation on the movement of said piston, and inlet and outlet connections branched from said chamber to the feed line on opposite sides of said main valve and controlled by said needle valves.

11. A boiler feed water regulator, comprising, in combination, a main valve controlling the feed line to the boiler, a piston unitary with said main valve, and of greater cross sectional area than said main valve, a chamber accommodating said piston, a float-operated valve remote from said main valve, a needle valve dependent for its operation on the movement of said piston, and passages branched from said chamber to the feed line and controlled respectively by said float-operated valve and by said needle valve.

12. A boiler feed water regulator, comprising, in combination, a feed inlet valve controlling the feed line to the boiler, a piston unitary with said feed inlet valve, the valve and piston unit presenting a passage for feed water, a chamber accommodating said piston and open to said passage, a needle valve controlling said passage, a connection between said chamber and the feed line, and a float-operated valve remote from said feed inlet valve and controlling said connection.

13. A feed water regulator, comprising, in combination, a main valve, a piston unitary with said main valve and of greater cross-sectional area than said main valve, a chamber accommodating said piston, the valve and piston unit containing a passage for feed water open to said chamber, a needle valve controlling said passage, an inlet connection to said chamber from the feed inlet side of said main valve, and a float-operated valve remote from said feed inlet valve controlling said connection.

14. A boiler feed water regulator, comprising, in combination, a feed inlet valve controlling the feed line to the boiler, a piston unitary with said feed inlet valve, the valve and piston unit presenting a passage for feed water, a chamber accommodating said piston and open to said passage, a needle valve controlling said passage, a connection between said chamber and the feed line, and a float operated valve device remote from said feed inlet valve and controlling said connection, said valve device comprising a valve element and a seat adjustable relatively to said valve element.

15. A boiler feed water regulator comprising, in combination, a main valve controlling the feed line to the boiler, a piston unitary with said main valve, a chamber accommodating said piston and discharging to the feed line on the boiler side of the main valve, the main valve and piston unit presenting a passage open at one end to said chamber, a float-operated valve remote from said main valve, a by-pass connection between the feed line and said chamber, said by-pass connection controlled by said float-operated valve, and a needle valve dependent for its operation on the movement of said piston and controlling the passage through the main valve and piston unit.

16. A feed water regulator, comprising, in combination, a main valve exposed on its underside to the feed discharge pressure, a piston unitary with said main valve and exposed on its upper side to the feed discharge pressure, a chamber accommodating said piston, connections to said chamber traversed by part of the feed water, a float-operated valve remote from said main valve and controlling one of said connections, and a needle valve dependent for its operation on the movement of said piston and controlling another of said connections.

17. A feed water regulator, comprising, in combination, a main valve exposed on its underside to the feed discharge pressure, a piston unitary with said main valve and exposed on its upper side to the feed discharge pressure, a chamber accommodating said piston, a passage traversing said piston and open to said chamber, a needle valve dependent for its operation on the movement of said piston and controlling said passage, a connection with said chamber traversed by part of the water, and a float operated valve remote from said main valve and controlling said last mentioned connection.

18. A feed water regulator, comprising, in combination, a main valve exposed on its underside to the feed discharge pressure, a chamber adjoining the main valve, a piston unitary with said main valve, said chamber accommodating said piston, and exposed on its upper side to the pressure of water in said chamber, a passage traversing said piston and open to said chamber, a needle valve dependent for its operation on the movement of said piston and controlling said passage, a connection with said chamber traversed by part of the water, and a float-operated valve remote from said main valve and controlling said last mentioned connection.

HAROLD HILLIER.